United States Patent [19]

Hechler, IV

[11] 4,010,768
[45] Mar. 8, 1977

[54] TWO-STAGE JET PUMP PROPORTIONER

[76] Inventor: Valentine Hechler, IV, 26 Meadow View Road, Northfield, Ill. 60093

[22] Filed: Dec. 10, 1975

[21] Appl. No.: 639,310

Related U.S. Application Data

[60] Division of Ser. No. 520,676, Nov. 4, 1974, which is a continuation-in-part of Ser. No. 443,831, Feb. 27, 1974, Pat. No. 3,933,179.

[52] U.S. Cl. .............................. 137/218; 137/599.1; 137/604; 239/318; 417/169
[51] Int. Cl.² ........................................ F16K 19/00
[58] Field of Search ............... 137/599.1, 604, 218; 417/169, 170, 189; 239/318, 414, 415

[56] References Cited

UNITED STATES PATENTS

| 408,714 | 8/1889 | Hogue | 417/169 |
|---|---|---|---|
| 513,378 | 1/1894 | Brownley | 417/169 |
| 1,940,268 | 12/1933 | Peterson | 239/415 |
| 2,381,589 | 8/1945 | Hayes | 417/189 X |
| 3,104,823 | 9/1963 | Hayes | 137/599.1 X |
| 3,167,090 | 1/1965 | Booth et al. | 137/604 |
| 3,698,644 | 10/1972 | Nystuen | 239/318 |

Primary Examiner—Robert G. Nilson
Attorney, Agent, or Firm—Watson D. Harbaugh

[57] ABSTRACT

A multiple stage jet proportioning and mixing pump system in which any variation occurring in the proportion ratio of the ultimate solution is confined essentially in the first proportioning stage operating at a low ratio below 1 to 5 with initial confluence of solvent and solute at substantially atmospheric pressure followed by the primary mixture being supplied to the second proportioning operation at a pressure preferably equal to that of the solvent jet at their confluence.

16 Claims, 5 Drawing Figures

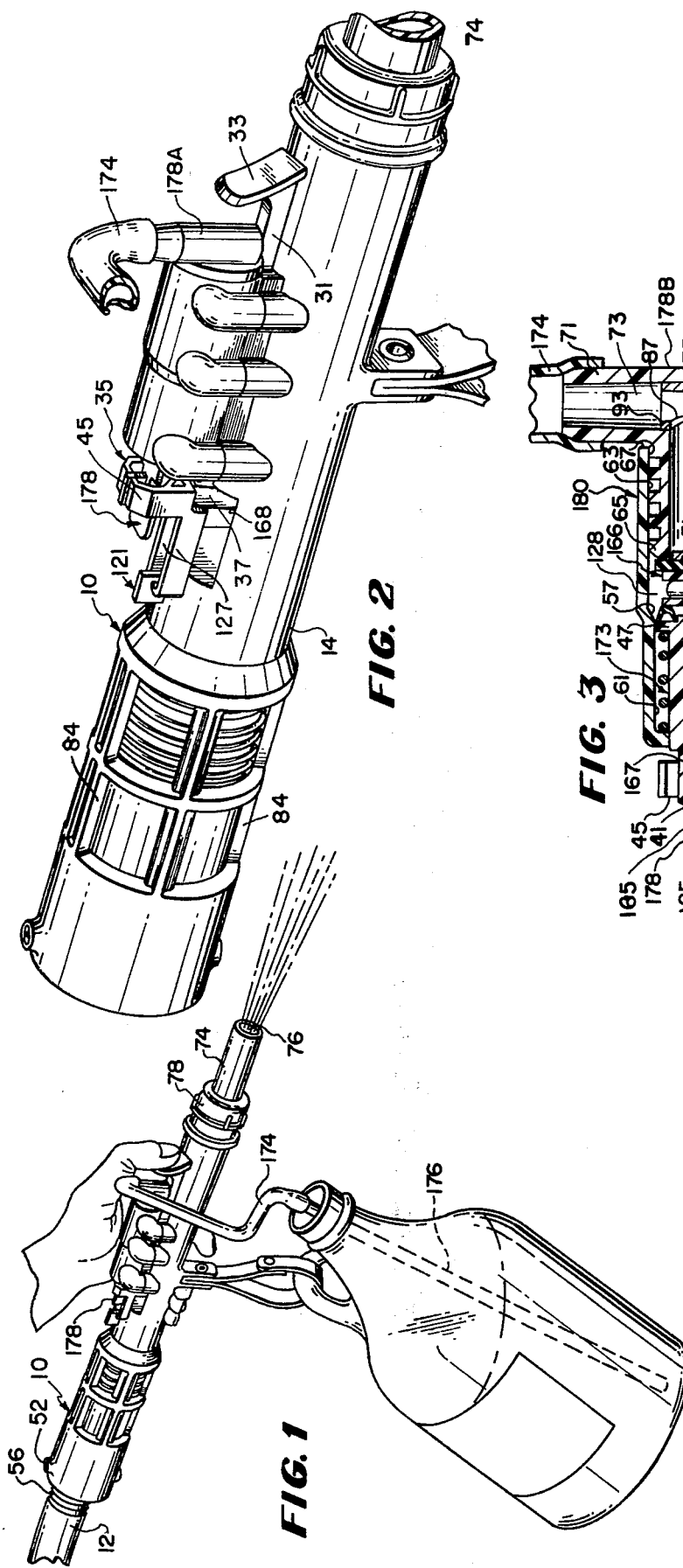
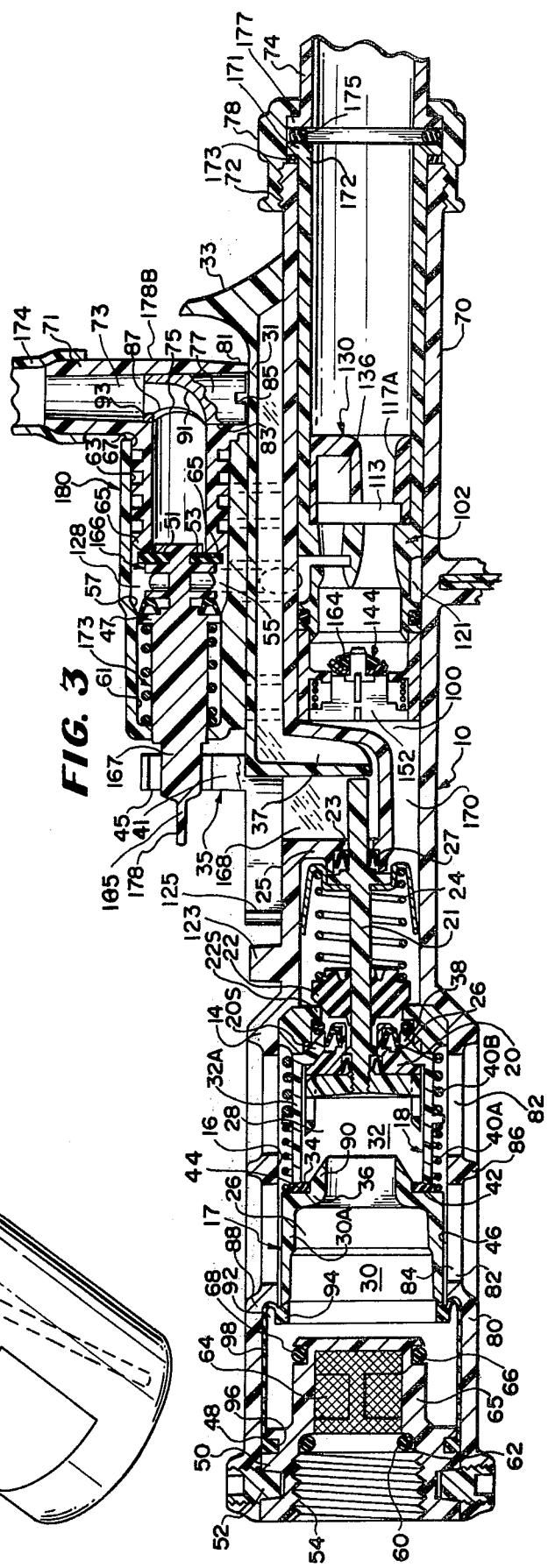

TWO-STAGE JET PUMP PROPORTIONER

This application is a division of application Ser. No. 520,676, filed Nov. 4, 1974, which in turn is a continuation-in-part of application Ser. No. 443,831, filed Feb. 27, 1974, and now U.S. Pat. No. 3,933,179.

Reference is also made to applicant's U.S. Pat. Nos. 3,862,640, issued Jan. 28, 1975; 3,863,843, issued Feb. 4, 1975; and 3,938,550, issued Feb. 17, 1976.

BACKGROUND OF INVENTION:

Recognizing heretofore that objectionable variations of the proportioning ratio in a jet pump below the ratio of 1 to 5 is related to pressure variations of solute lift heights, the conventional practice, particularly with portable jet pumps, is to employ a single stage pump operating above the 1 to 5 ratio and reduce the significance of varying lift heights by developing a deep vacuum condition approaching zero p.s.i. absolute for the solute supply, and, then conducting the solute through a flow restriction to meter the amount of solute desired for the ratio proportioning.

Tolerated performance ratios available are generally limited to those above a 5 to 1 ratio in order to utilize the vacuum-solute-restriction arrangement. At greater proportioning ratios the efficiency is highly unstable with changes in solvent pressures, the ratio varying as the square root of the solvent pressure. With solute at approximately zero gauge pressures, ratios provided by a conventional single stage pump also present undesirable ratio variations with solvent pressure changes.

SUMMARY OF INVENTION:

The present invention is concerned with an entire, continuous proportioning and mixing jet pump system supplied with a solvent at substantial positive gauge pressure such as experienced with municipal water systems, or higher, and with a solute having a wide open flow at approximately zero gauge pressure. The pump system is multistage having at least two stages in which the output of the first stage is the solute for the second stage.

Each stage comprises a solvent jet nozzle having an outlet port and a pump chamber having an inlet port spaced from the outlet port to provide a confluence gap therebetween supplied with solute. The flow areas of the four outlet and inlet ports are so related mathematically to one another that undesirable variation, if any, from the designed ratio of the ultimate mixture of the system is confined to the first stage. "Variation" as used here is sometimes referred to as degradation and means a plus or minus variation in percentage ratio from the designed percentage ratio. Moreover, knowing that ratio degradation occurs with variation of the solute input pressure, the ultimate ratio is divided in such a way that the first stage ratio resides in that range of ratios where minimum ratio variation exists for a determined flow rate and variation in the second stage is essentially eliminated. Also the first stage is designed to receive solute within the range of 2 p.s.i. of zero gauge pressure with wide open flow and with the pressure at the output thereof equal to the solvent pressure in the gap of the second stage which in turn is related to an output nozzle for dispensing the end product at low pressure (soft flow) or an applicator nozzle ejecting at a high pressure (spray flow).

At zero p.s.i.g. pressure on the solute at the pump inlet there is little, if any, loss of energy that is conventionally lost in lifting the solute under conventional deep vacuum conditions, accordingly, the efficiency is at an optimum. The relative sites of the nozzle and pump openings determine the ratio, their overall sizes the volume.

More particularly, a two-stage jet pump with a converging wall leading to jet nozzles converts the pressure on the water to jet flow energy at zero p.s.i.g. gauge in the first stage and a designed positive pressure in the second stage and the resulting jets are directed across gaps having free flowing solute supplied to them in the first stage gap and a designed positive pressure equal to the output of the first stage substantially at zero p.s.i.g. The confluent liquids are directed into substantially short cylindrical pump openings or chambers having flow areas larger than the respective nozzles in the ratios that produce the ultimate proportioning desired. The solute gauge pressures are effective at least within a distance equal to the radius of the respective inlet openings of the cylindrical pump chambers. The jetting water molecules freely and fully transfer flow energy in proportion to their jet strength to entrain molecules of the solute in the gap and the pump cylinder in relation to the differential in the relative sizes of the inlet and outlet ports thereof to provide the predetermined proportioning with little if any drag to mix the confluent liquids once the free flow thereof is induced. Since free flow of solute occurs almost instantly with little if any vacuum drag developing the mixing at the same pressure, approximately zero p.s.i.g., at the gap relates the proportioning directly to flow ratios. Thereby, the relative cross-sectional port sizes can provide the mixing ratios directly in relation to solvent pressure-rate flow at the gap without negative pressure deviation in ratios of flow at the gaps, the accuracy increasing with increase of flow in a pump designed for handling an average solvent pressure at a flow rate expected to be used.

In the drawings:

FIG. 1 is a perspective view of the proportioning mixer-dispenser embodying the preferred embodiment of the invention as manipulated in use and operation;

FIG. 2 is an enlarged perspective of the proportioning mixer-dispenser shown in FIG. 1;

FIG. 3 is a longitudinal vertical sectional view through the gun handle portion of the equipment shown in FIG. 2;

DESCRIPTION OF A PREFERRED EMBODIMENT

Figure 4:
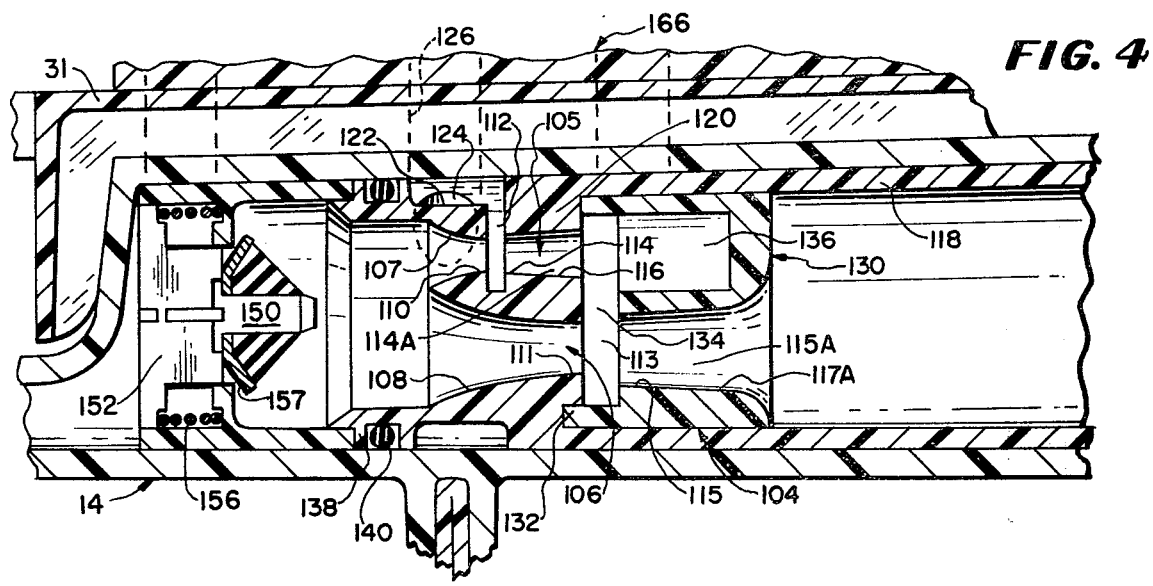
FIG. 4 is an enlarged sectional view of a jet pump embodied in the proportioning mixing-dispenser shown in FIG. 3 for soft flow discharge; and, FIG. 5 is an enlarged sectional view of a jet pump modification of the jet pump shown in FIG. 4 for pressure or hard spray discharge.

The invention will be described, by way of example, as related to the proportioning, mixing and dispensing of municipal water under pressure serving as a solvent, and a chemical concentrate serving as a solute under free open flow subject only to minor gravity influences, if at all.

The invention is illustrated as part of a manually controlled proportioner-mixer-dispenser gun 10 connected to the outlet of a garden hose 12 to utilize municipal water as a pressurized source under normal working pressures ranging from 15 to 100 p.s.i.g. with 40 p.s.i.g. considered to be average. Higher pressures may be handled depending upon the thickness or the structural material used in the housing 14 of the device, or both. If the water pressure drops towards zero gauge pressure, the gun 10 is preferably vented fully against backflow contamination of the water source while substantial positive gauge water pressure is still present in the housing 14.

For this purpose the housing 14 provides an anti-contamination venting chamber 16, housing automatically interacting flow control vent means 17 and 18, and a manual control valve 20 along with a backflow check valve 22, having their seat members 20S and 22S disposed between them, to selectively control forward flow and automatically prevent backflow therethrough. The vent valves 17 and 18 cannot be closed nor can the valves 20 and 22 be opened until there is substantial gauge pressure in the venting cavity 16. They can only be opened to provide flow when the solvent supply pressure is above a predetermined positive working gauge pressure.

The anti-backflow control valve 22 is initially activated by spring 24 at 6 to 10 p.s.i.g. so that when the pressure is dropping all backflow of mixture is prevented by forward pressure flow of fresh water and the device is fully flushed and vented before zero p.s.i.g. is reached. Above 10 p.s.i.g. the proportioner is operative for proportioning and dispensing a mixture as controlled by the manual flow control valve 20. Thus, both conditions are associated with each other alternatively; to-wit: flush-vent when solvent pressure is too low to dispense effectively; or, close-dispense when acceptable proportioning water pressure is present.

SOLVENT SUPPLY AND FLOW CONTROL:

As more particularly described in Hechler U.S. Pat. No. 3,862,640, two chambers 26 and 28 are preferably defined by valves 30 and 32 that have movable side walls 30A and 32A which, when subjected to adequate water supply pressure, coact with each other to close vent openings at 34 between their side walls. Movable end walls 36 and 38 comprise valve elements for automatic flow control coordinated for predetermined coaction as spring opened at low p.s.i.g. water supply pressures.

Lost motion means including springs 40 and seals 42 are disposed between the movable walls 30A and 32A to assist coordinated action therebetween whereby there is no leakage when any positive working pressures are applied. Furthermore, the chamber 28 downstream of the end wall 38 is minimal in volume and is greatly enlarged when venting and draining while water pressure still exists in the upstream chamber 26. The automatic downstream valve at 44 is closed and the upstream chamber 26 vented if the main valve 20 is open, and the downstream backflow check valve 22 is positively closed while the port at 34 between the two chambers is closed by the main valve as the upstream is washed with fresh water still under pressure after the venting has begun.

Referring now to FIGS. 1–3, the unitary housing 14 is molded of a plastic such as polypropylene or acetal resin, depending upon pressure to be handled such as municipal water pressure either as supplied or boosted. The housing 14 has an elongated compartment 46 therethrough with walls that are internally cylindrical for ease of assembly without need for relative rotational adjustments. The housing inlet opening end 48 receives a hose adapter 50 that is held in place by tapered screws 52 to provide a coarsely threaded opening 54 (FIG. 3) for mating only with an outlet male fitting 56 that is conventionally provided on the garden hose 12. The end 58 of the fitting 56 seals against an O-ring 60 supported by a shoulder 62 and clean water flow is protected by a cylindrical screen 64. An external groove 66 is provided on the adapter and receives an O-ring 68 and serves as the male member of a slide valve which partially closes for a certain distance of movement before it fully closes.

The outlet end 70 of the housing 14 is externally threaded with an unconventional thread 72 or a castellated keying system, or both, which prevents standard water house connections of gardening equipment being reversely or improperly made. Only an intended unique outlet fitting such as a nozzle 74 can be attached which preferably is open continuously for discharge to atmosphere at 76 as held in place by a collar 78. Intermediate the inlet and outlet and proximate to the inlet opening the housing wall 80 is provided with large longitudinal vent openings 82 bordered by reinforcement ribs 84 extending from a circular flange 86 internally defining a surface of revolution to guide reciprocating parts therein and an intermediate flange 88.

Coacting with the valve head 65 is the valve member 30 having a snorkel 90 which slides substantially frictionlessly in guided relation upon the inner edges of the ribs 84 and flange 88 on the housing wall as located upstream of the elongated vent openings 82 where a space 92 is provided between the snorkel and housing wall. In space 92 and interconnecting the downstream edge 94 of the valve member 30 and the groove 96 on the adapter is a resilient frictionless sleeve 98 reversely telescoping on itself to seal the upstream side of the snorkel from the vent opening 82. The rolling seal 98 is never subjected to more than 10 p.s.i.g. but what its bight portion is being supported by the flange 88.

PROPORTIONING AND mixing:

The housing 14 is also supplied with solute as later described and provides a mixing chamber 100 adjacent its outlet end which receives the solvent from the chamber 28 and houses interchangeable proportioning-mixing devices further described herein as sometimes referred to as jet pump units 102 that comprise one or more proportioning pump sections for handling solutes in different proportions or at different flow rates, or both.

Figure 5:
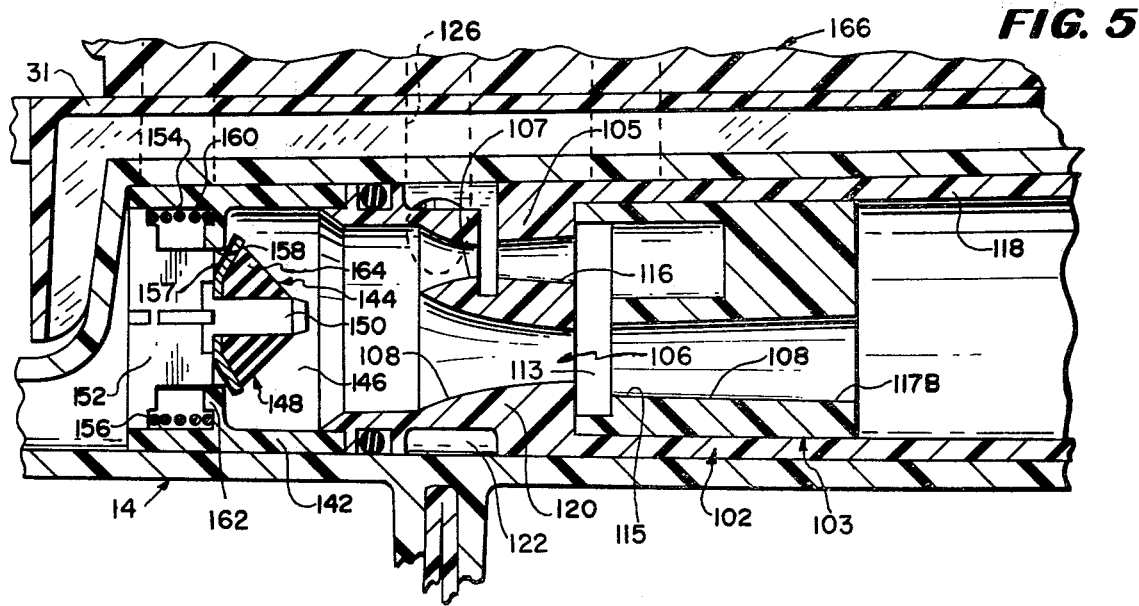

More particularly referring to FIGS. 4 and 5, the jet pump units illustrated in FIG. 4 provides a soft flow while the embodiment illustrated in FIG. 5 provides a hard flow for the mixtures, in view of the respective contours of their outlet nozzles 103 and 104.

JET PUMP UNIT CONSTRUCTION:

The preferred construction common to the pump units comprises a cylindrical housing or shell 118 having an internal partition 120 defining pressure conversion nozzles 110 and 111 terminating in nozzle ports 107 and 108 respectively, the latter extending all the way through the partition. The pump chamber 114 and the diverging wall 116 of the first stage leading therefrom is formed coaxially with the primary jet and terminates on the downstream side of the partition. The primary stage gap chamber is formed as a segmented compartment exposed externally to receive solute from a peripheral groove 122 on the shell where it axially coincides in communication with the solute openings 124 of the passages 126 that lead from the solute valve chamber 128.

The pump chamber 115 of the second stage 106 is provided in an insert member 130 received in the shell 118 as aligned coaxially with the second stage jet nozzle port 111 by a guide tongue-and-groove means 132 which mate when the insert is located in place. Diametrically opposite the first stage pump cylinder, the insert 130 is provided with a primary mixing well 136. The insert is recessed a determined depth to define a second stage gap 113 that is in communication with the primary stage diverging wall 105 and the mixing well 136 to provide a free flow of the primary mixture as the solute for the second stage gap.

It will be appreciated that the partition 120 may be made the insert and the insert 130 the partition depending upon which element may be interchangeable to provide particular ones of several ultimate ratios.

The upstream end of the shell 118 has spaced rings 138 around it to receive an O-ring seal 140 against the inside wall of the outlet end 70 of the housing and ahead of it is a cylindrical ring 142 receiving a normally closed backflow check valve 144 in a compartment 146, both streamlined, for conducting solvent to both sections 105 and 106, without turbulence, and, which serves as a spacer determining the coincidence of the primary solute passages 126 with the groove 122. The downstream end 172 of the shell 118 has a radial flange 171 inwardly carrying a washer seal 173 abutting the end of the outlet end 70 of the housing 14 and is engaged externally by a washer seal 175 supporting an external flange 177 of the nozzle 74 as clamped in place by a collar 78.

JET PUMP ACTION

The jet pump unit 102 preferably is multi-stage having an assembly shell 118 housing two jet sections 105 and 106 illustrated side-by-side to operate in tandem. Each one of the sections has converging wall nozzles 107 and 108 leading to ports 110 and 111. The converging walls convert pressure on the water to jet flow energy with the resulting jets of water directed through gap chambers 112 and 113, respectively, at reduced pressure. Each gap has a flow area larger than its respective port. From the gaps the two jets flow coaxially through larger ports 114 and 115 into short cylindrical pump chambers 114A and 115A, respectively. The differential in sizes of the ports 110 and 111 with respect to ports 114 and 115 provides the proportioning ratio. In the gaps, and in the pump chambers a distance at least one-half their port diameter, the water molecules transfer energy to and entrain molecules of the solute at the gauge pressure existing in the gap. Thereafter, the mixture passes through diverging walls 116 and 117, respectively, to convert the flow energy back to pressure for ejection through the dispensing nozzle 74 which has a flow area substantially less than the flow area ahead of the jet pump. Preferably, the pressures in the gaps are the pressures on the solutes, as supplied to them, the first stage gap pressure being as near to zero gauge pressure as possible to reduce degradation and the pressure in the second stage gap being related to the positive back pressure developed by the outlet nozzle 74.

For an example in a dispenser for 6 G.P.M. at a line pressure of 40 p.s.i.g. and a final ratio of 1 to 24, the ratio of the first stage could be 1 to 3 (1 part in 4 parts) and the port diameters would be:

| First stage | and | Second stage |
|---|---|---|
| .0664" and .0885" | | .1713" and .2056" |

For an applicator the first stage would remain the same while in the second stage the port diameters would be approximately 14% larger.

MAINTENANCE OF PUMP UNIT PRIME

As shown, the valve member 148 of the check valve 144 is mounted on a pin 150 that is integrally formed axially of and as a part of a cross-shaped guide follower 152 whose peripheral edges 154 serve as guides engaging the cylindrical walls 156 of the ring 142 and the valve port 158 therethrough. A light compression spring 160 between the follower 152 and the valve flange 162 defining the port valve 158 urges closure of the valve 144 which comprises a plastic conical shell member 157 resiliently supported by a conical resilient retainer wedge 164 on the pin 150 and shaped to streamline liquid flow around it ahead of the jet pump portion of the unit.

The valve 144 is assembled in place in the ring 142 and opens in the direction of solvent flow. Then with the anti-contamination venting of the solvent chamber 16 when the solvent pressure is below a low positive gauge pressure the backflow check valve 144 as urged by the spring 160 serves a dual purpose and not only assists in preventing backflow from the jet pump unit 102 after the solvent chamber is vented, but more significantly retains the prime of the jet pump unit once established, regardless of the openness of any other valves unless the manually operated solute valve 166 in the solute chamber 128 is intentionally held open as when desirable to empty the jet pump unit.

In controlling the solvent flow, the outer end of a stem 21 for the manual valve 20 extends in an axial direction through an opening 23 in a cross-wall portion 25 having a V-ring seal 27 therein which seals the stem as terminally exposed to atmosphere in the external housing recess 168 located between the chambers 16 and 100. Manual actuation of the flow control valve assembly is by a push rod 31 reciprocably mounted on the housing 14. The front end of the push rod is reversely formed to provide a thumb handle 33 and the rear end carries a T-shaped head 35 thereon whose lower arm 37 engages and actuates the valve stem 21 where it projects into the recess 168 and whose upper arm 41 is bifurcated to releasably actuate the solute valve 166. At its rear end a manual release catch 121 is provided to catch and hold the main valve 20 open for dispensing. For this purpose a protuberance 123 is formed on top of the housing and the rear end of the push rod 31 is provided with a U-shaped spring latch hook element 125 which is released by spreading the hook arms 127.

SOLUTE SUPPLY

Although the solute supply tube 174 could lead directly to the space 128 from the dip tube 176 and be manually attached for the intermittent dispensing of water alone, contact of some insecticides and other solutes with a person's skin can cause injury or be dangerous to life itself. It is preferred to valve the solute simultaneously with the water through the selective connection 178, later described and for this purpose the solute valve unit 180 is located on top of the outlet 70 of the housing 14 just to the rear of the main valve actuator thumb handle 33 and internally has two cylindrical portions 61 and 63 of different diameters separated by a tapering shoulder 57.

The solute supply valve 166 connected to a solute supply is provided to control the solute supply to the proportioning and mixing device. The valve is essentially spool shaped and is selectively actuatable simultaneously with the manual flow control valve 20 so that either plain solvent or a wide variety of chemical solutions can be discharged merely by selective engagement of the solute valve 166 with the push rod 31 by turning the solute valve shaft 167 a quarter turn for its T-shape end 165 to be engaged by the actuator fork 45 on the rear end of the push rod 31.

In this connection the effective area of the wall 47 of the spool valve 166 exposed to atmosphere is greater than that area 51 thereof exposed to the solute valve inlet port 53 when closed so that any drop in pressure in the intermediate space 55 open to the passage 126 will tend to hold the valve 166 closed. Thereby, during operation, the valve chamber with solute flowing is under a moderate draft pressure and the load on the push rod 31 is quite modest. On the other hand, if solvent alone is being dispensed, there is no load involved with the push rod and the negative gauge pressure of the unsatisfied aspirating effect is quite deep against the internal larger area of the valve wall 47 and keeps the valve closed.

The larger cylindrical portion 63, referred to above, opens towards the front of the gun where it receives an L-shaped conduit fitting 178A (FIG. 2) or T-shaped fitting 178B (FIG. 5) whose inner end valve head 65, or leg, is of the full housing diameter 63 and is rotatable as sealed in the mouth 67 of the valve chamber under mild negative gauge pressure during operation with the solute suspended from the gun. The inner end of the members 178 serves as the cut-off valve seat. The outer end of the arm 71 serves as a nipple that can be adjustably positioned over 180° on either side for the convenient attachment of the semi-transparent solute supply hose 174 where the prime of the solute can be visually checked at a glance.

The modification 178B of the fitting is essentially a T-fitting with the head end of the passage 73 in the leg portion providing a valve port 75 where it intersects the arm openings. A rotary valve 77 is mounted in the second arm 81 with a slight frictional tapered journal 83. The valve 77 has an externally exposed screwdriver kerf 85, which also serves as an indicator, and a hollow inner end 87 defining an L-passage 91 therethrough. A ring element 93 at the inner end journals the inner end so that the lateral opening coacts as a valve with the cylindrical concavity of the valve port 75. With this arrangement the T-fitting can be displaced 180° for left or right hand operation, and the rotary valve 77 is subjected to negative gauge pressure at the port for holding the valve in position.

If the T-fitting is used in place of the L-fitting with a double stage pump the valve is wide open. It may be adjusted for a single stage pump but repeated adjustment is rarely needed. Adjustment, for instance, manually by a screwdriver if a comparator described in Hechler Ser. No. 482,353 is being used.

The phrase "gauge pressure" employed herein means a pressure above atmospheric or environmental pressure and is sometimes referred to specifically as positive gauge pressure.

From the drawings, the description relating thereto and the appended claims, it will be appreciated that a jet pump having two or more stages provides for better accuracy and control of the proportioning ratios as well as the extension of the narrow range of such ratios with respect to variations over the range of substantial municipal water supply pressures; with free flowing solute at atmospheric pressure the energy trnsfer process never creates any negative gauge pressure at the gap more than that entailed in accelerating the solute in the first stage for entrainment in the jetting water; and, the variation of ratio with pressure changes is negligible over the system, the higher the pressure the greater the efficiency; the use of the diverging wall energy converter provides pressurized output cable of providing exceptionally good nozzle operation; wide open energy transfer chambers along with full flow large tubing and fittings that are not easily clogged by wettable powders nor unduly restrictive to the passage of viscous concentrates; the very high turbulence created by the energy transfer process within the energy converters assures homogenous blending of the output spray solution; and, a wide range of pump units of different characteristics can be provided, one for each ratio described with each solute that will be used, the outer shell 118 in each case being long enough to receive longer inserts in sealed relation with respect to suitable nozzles 110 and 111 selected for the ultimate dispensing pattern desired.

Thus, a first dilution proportioning is thereby accomplished in the first stage jet pump and the final mixture proportioning is accomplished in the second stage jet pump by its converting nozzle, gap and diverging wall arrangement. The concentrate is first diluted and mixed with diluent at one ratio proportion with minimized differential of confluency pressures, and that mixture further diluted and mixed at the same confluency pressure for discharge at the outlet of the housing 118 in its final proportioning ratio through the nozzle of the expanding walls 117 with very little if any degradation. Thereby, any degradation of proportioning rates is confined to the first stage which can be closely designed and it isolates the second stage against variables that might cause degradation in the second stage. The optimum performance of the first stage in providing a concentration of 20% to 40% encounters no variation in concentration in the second stage. Any variation of ultimate concentrate and the final mixture is minimal, less than 5% over a wide range of municipal water pressures.

The action of the jet pumps, accordingly, provide a quite accurately proportioned mixture for dispensing through a fixed but interchangeable spray nozzle on the front end at water pressures that are well above 5 p.s.i.g. Below this pressure the springs 40A and 40B open the valves 30 and 32 and valve 30 closes over the valve head 65, for the anti-contamination backflow purposes already described, it being noted that if the manual valve 20 is open, the water chamber is vented also through the manual valve yet the prime of the jet pump is not lost.

Stability and constancy of the mixture ratio throughout a wide range of water pressures above 10 p.s.i.g. is controlled essentially by the relation of the molecular energy transfer confluent flow areas measuring the water jets and solute flow at the gaps, same being maximized and the skin friction of the mixing chamber wall surface upon solute flowing through it being minimized by generally a 6° included diverging angle. The greater this accomplishment, the more constant the mixture ratio is over a wide range of municipal water pressures and wide range of proportions. The energized relative flow areas of the solute and water jet determine the ratio flowing from the mixing gaps at substantially the same pressures at each gap.

SUMMARY

Degradation is approximately proportional to the ratio in the first stage. Comparing a 24 to 1 single stage ratio system with a two stage system embodying the invention, degradation in the single stage would be based at 24 to 1. On the other hand, with the two stage system divided up arbitrarily on a 4 to 1, 6 to 1 basis, the degradation would be based on that occurring, if any, in the first stage and would be at a 1 to 4 ratio rather than the 1 to 24. No further degradation will occur in the second stage. The final output would still be 24 to 1. Thus, the degradation would be reduced by a factor of 6 to 1 in the overall system. If a 3 to 1 first stage would provide less degradation this would mean a further reduction by an 8 to 1 factor in the overall system. Assuming a degradation of plus or minus 20% due to conventional variation of pressure from zero gauge on the solute entering the single or first stage the end result by using the two stage system of the invention will be plus or minus 3% for a given plus or minus input change.

The two stages as designed and used not only reduces degradation in the first stage but makes tolerable what otherwise may very well be intolerable since variations could conventionally be as much as 40±% with variation in solvent input pressures. Even with 40% degradation, the cut down would be to 6%. Furthermore, assuming that there is no variation of input pressure on the solute entering the first stage gap the pressure of solute at the first stage can be considered to be zero gauge pressure and may be so designed for in the present invention. The gap pressure will be a balanced system in both stages, and in the system as described the pressure may or may not have a zero input to the second stage depending upon whether or not a second stage pressurizing expansion energy-to-pressure conversion chamber is used. This in turn depends on what the output pressure is to be at the final outlet of the gun. If the solution output is a soft flow through a wide open outlet, a zero pressure at the gap of the second stage as well as at the first stage is employed in this invention. If the output is to be ejected as a spray, there will always be a much higher pressure than gauge pressure in the gap of the second stage, and, the output at the second stage right at the mixing gap will also be that pressure for both the solvent and solute. If the pressure at the solute input of the second stage is zero the instant outlet gauge pressure will be zero within a half diameter of the outlet opening of the second stage gap. If it is 40 p.s.i.g. the pressure, in the gap of the second stage will be that pressure.

A variation downwardly from zero gauge solvent input pressure causes the degradation at the first stage and the balancing of the pressures at the second stage confines this degradation to the first stage.

Thus, in the design of the pump proportioning and mixing invention a mathematical relationship for the four port areas of a two stage system is so interrelated that if any degradation occurs it is confined to and is essentially that of the first stage degradation.

Accordingly, the first stage ratio can be selected which has minimum degradation for its expected use and the overall accuracy of the ultimate proportion is greatly improved, and, the higher the solute pressure above zero gauge pressure at the gap the greater the accuracy of the product mixing ratio.

The phrase "gauge pressure" or "p.s.i.g.," as employed herein, means a pressure above atmospheric or environmental pressure and is sometimes referred to specifically as positive gauge pressure.

From the drawings, the description relating thereto, and the appended claims, it will be appreciated that the advantages of the spray device include:

A. The jet pump provided having two or more stages for better accuracy and control of the proportioning ratios over the range of substantially all municipal water supply pressures;

B. The energy transfer process never creates any negative gauge pressure at the gap more than that essentially entailed in entraining the concentrate in the jetting water;

C. The variation of ratio with pressure changes is negligible over the range of pressure changes experienced with municipal water systems;

D. Wide open energy transfer chambers along with the full flow large tubing and fittings employed are not easily clogged by wettable powders, nor unduly restrictive to the passage of viscous concentrates;

E. The very high turbulence created by the energy transfer process within the energy converters assures homogenous blending of the output spray solution;

F. Wide specification limits are provided for water pressures from 10 to 100 p.s.i.g. with narrow ratio variations, and, with water temperatures as high as the material of the gun parts will permit. The preferred materials used are polypropylene, polyvinyl acetal resin, or the like, and synthetic seal materials selected with regard to the chemicals handled;

G. Quick-change matched jet pumps and nozzles enable a selectably up to 1 to 7 gallons-per-minute delivery in a housing having an internal diameter of 1 inch and flow area of ½ inch; mixture ratios up to 20:1 with a single stage jet pump and up to 200:1 with two-stage pumps; any cone spray up to 30° and the utilization of a mixture of any viscosity concentrate capable of flowing;

H. A thumb-operated valve provides instant and exact control of two different flow rates and also control of operation selectively with or without solutes;

I. Automatic flow cut-off overrides the thumb operation whenever input pressure is insufficient for satisfactory proportioning;

J. Extra large concentrate tubing and ports and manually full opening valves minimize any pressure drop, particularly on concentrates;

K. A slim-line gun dispenser is easy to grip with a balance hing-like wrist suspension of a concentrate container below it for minimal height lift;

L. Large mouth, one-gallon, or a half-gallon, container with open mouth, or vented, cap can be used for suspension including original shipping containers with concentrate already in them; and M. Extra large valve ports assure insignificant pressure loss through valves on flows up to 7.5 gallons-per-minute with a housing approximately 1 inch in diameter, internally;

N. The main valve can easily be opened against liquid pressure after preliminary opening of the pilot valve and once a solvent flow begins, the relative drop in pressure between the two valves due to the Bernoulli effect draws the main valve further open so that the valve space required for the two valves is reduced to that required for a single valve that opens wide for minimal drop across the valve port and closes as a single valve with rapidity.

What is claimed is:

1. In a mixture dispensing device having a housing defining a mixing compartment;
   normally open valve means for conducting solvent to said compartment above a comparatively low positive gauge pressure including a vent valve and flow control valve closed by solvent present having a pressure above said low positive gauge pressure;
   manual means for actuating the solvent valve means above said low pressure and the solute valve means simultaneously therewith; and,
   jet pump mixing means in said compartment inducing said lower pressure by confluent flow of said solvent and solute for mixing said solvent and solute in a solution of predetermined portions.

2. The device defined in claim 1 including means for inducing said lower pressure by flow of said solvent mixing with and acting upon solute supplied through said solute valve means.

3. The device defined in claim 2 in which said jet pump mixing means comprises:
   means conducting solvent at high pressure through converging walls and ejecting it as a column through a gap into a throat having a size greater than that of the column, and said solute valve means having its outlet connected to supply solute to said gap; and
   back flow check valve means between said solvent valve means and said solute valve means for maintaining solvent and solute prime of said gap.

4. The device defined in claim 2 including a nozzle having a flow area substantially less than the water flow area ahead of the jet pump means.

5. The device defined in claim 1 including a jet mixing pump in said mixing chamber establishing by operation of the positive gauge pressure upon the solvent valve a negative gauge pressure upon the solute valve.

6. A jet pump mixing and dispensing unit comprising:
   a housing defining a compartment, means received in said compartment having a first section defining two spaced passages with converging walls of different lengths defining nozzles each terminating in a port, one passage defining a long nozzle extending through the section and terminating in one port, the other passage defining a short nozzle terminating in another port at a mixing chamber that is laterally open to the outside of said housing to receive solute under approximately zero gauge pressure, said other passage extending beyond the mixing chamber and terminating in a passage portion having diverging walls coaxial with the other port and ending in an outlet; and
   means in said compartment defining a second section coacting with said first section to define a second mixing chamber interconnecting the one port and opening at the downstream end of said second section.

7. The jet pump unit defined in claim 6 in which: said first section is stationary; and, said second section is a removable insert.

8. The jet pump unit called for in claim 6 in which said discharge conduit has diverging walls.

9. A solution proportioning, mixing and dispensing device comprising:
   a plurality of liquid flow jet pump means, each comprising a conically converging side wall terminating in a jet nozzle port to convert solvent under pressure to jet flow energy at approximately zero gauge pressure jetting into respective mixing stage chambers filled with solute at approximately the same pressures; and
   a pump chamber for one of the nozzles having an inlet opening of a size larger than the jet port thereof disposed in axial alignment therewith with a terminal section of a conical diverging contour for converting flow energy to pressure flow, said nozzle and pump chamber being spaced to provide a gap defined by one of said mixing stage chambers supplied with a free flow of solute at approximately zero gauge pressure and said one pump chamber operating with free flow to the other mixing stage chamber;
   the ratio of the area sizes of the jet port to the inlet opening determining the proportioning ratio.

10. The device defined in claim 9 in which said ratios of flow area sizes are substantially the same.

11. The device defined in claim 9 in which the pressure of the solvent and the solute in the second stage gap are substantially the same.

12. The device defined in claim 9 in which the ratio of area sizes of the jet inlet opening and mixture receiving port being less than 1 to 4.

13. A jet pump solute mixing unit comprising:
   a shell internally having a unitary partition means defining a first stage confluence chamber and an insert means forming with the partition means a second stage confluence chamber between them;
   said partition means defining spaced nozzles whose inlets are open to a common source of liquid solvent under pressure having conical converging side walls terminating in jet ports, one of the ports opening into the first stage mixing chamber and the other into the second stage confluence chamber;
   said partition means defining a primary mixing pump having an inlet port spaced from and disposed in coaxial alignment with said first stage jet port to define a first stage confluence gap therebetween in which solvent under flow energy entrains solute;
   said primary mixing pump defining conical side walls that diverge from said primary stage inlet port to entrain solute followed by diverging side walls to mix the solute and solvent and convert the flow energy of the mixture to pressure at a primary stage mixture outlet therefrom directly in communication with said second stage confluence chamber, said insert means defining a second stage mixing pump having an inlet port from said second stage confluence chamber disposed in coaxial alignment with said other jet port and defining diverging side walls following said inlet port to convert the flow energy of the mixture therein to pressure at the outlet therefrom;

the relative sizes of said jet ports and pump chamber ports determining the ratios of solute and solvent at said gaps;

aperture means through the wall of the shell for conducting solute to the primary gap; and means for conducting solvent to both of said converging nozzles.

14. The jet pump defined in claim 13 including a backflow check valve means upstream to the pressure conversion nozzles for maintaining the prime of said pumps.

15. The jet pump unit defined in claim 13 including a short cylindrical section between the inlet port and the diverging wall following it.

16. A jet pump unit comprising:

a housing having a cross wall means intermediate its ends and defining a chamber at its outlet and;

said cross wall having a first passage therethrough defined by converging walls as its upstream end terminating in a jet nozzle, and by diverging walls at the downstream end with an entrance port larger than said jet nozzle, and a solute supply passage opening laterally through the housing and defining an enlarged gap between said nozzle and entrance port;

said cross wall having a second passage through the cross wall defined by converging walls terminating in a jet nozzle;

an insert means received in said chamber downstream of said cross wall having a passage therethrough defined by diverging walls having an entrance port larger than the second jet nozzle and coaxial therewith; and, the facing walls of said cross wall and insert means defining between them a space forming a gap connecting said second jet nozzle in communication with said diverging walls.

* * * * *